United States Patent
Peek et al.

(10) Patent No.: US 6,653,816 B2
(45) Date of Patent: Nov. 25, 2003

(54) BATTERY WITH EMBEDDED POWER MANAGEMENT

(75) Inventors: Sarah A. Peek, Atlanta, GA (US); Iilonga Thandiwe, Atlanta, GA (US)

(73) Assignee: Motorola, Inc., Schaumburg, IL (US)

( * ) Notice: Subject to any disclaimer, the term of this patent is extended or adjusted under 35 U.S.C. 154(b) by 263 days.

(21) Appl. No.: 09/887,945

(22) Filed: Jun. 24, 2001

(65) Prior Publication Data

US 2002/0195997 A1 Dec. 26, 2002

(51) Int. Cl.[7] .................................................. H02J 7/00
(52) U.S. Cl. ....................................................... 320/132
(58) Field of Search ............................... 320/132, 134, 320/149, 158; 710/240, 126, 61, 32, 129, 68; 714/47; 307/48, 156; 429/90, 91; 703/14, 15; 455/572, 574

(56) References Cited

U.S. PATENT DOCUMENTS

| | | | |
|---|---|---|---|
| 4,677,566 A | 6/1987 | Whittaker et al. | 713/324 |
| 5,392,437 A | 2/1995 | Matter et al. | 713/324 |
| 5,483,656 A | 1/1996 | Oprescu et al. | 713/320 |
| 5,504,413 A | 4/1996 | Fernandez et al. | 379/322 |
| 5,832,285 A | 11/1998 | Shimada | 713/325 |
| 5,889,721 A | 3/1999 | Gannage | 365/226 |
| 6,046,513 A | 4/2000 | Jouper et al. | 307/31 |
| 6,163,706 A * | 12/2000 | Rozenblit et al. | 455/522 |
| 6,173,350 B1 * | 1/2001 | Hudson et al. | 710/240 |
| 6,191,557 B1 * | 2/2001 | Gray et al. | 320/132 |
| 6,192,480 B1 * | 2/2001 | Barrus | 713/320 |
| 6,397,170 B1 * | 5/2002 | Dean et al. | 703/14 |
| 6,522,104 B1 * | 2/2003 | Drori | 320/149 |

\* cited by examiner

Primary Examiner—Pia Tibbits
(74) Attorney, Agent, or Firm—Philip H. Burrus, IV

(57) ABSTRACT

This invention includes a power management method and apparatus for portable electronic devices, like cellular phones for example, to which accessories may be attached. These accessories include MP-3 players, personal digital assistants, and pagers. In a simple embodiment, a battery pack having a fuel gauge and power management controller measure an energy profile required by the host. From this profile the power management controller can determine when accessories are attached to the host by the amount of power being drawn. When the capacity of the cell is reduced below a predetermined threshold, the power management controller notifies the user that a limited amount of operational time remains and accessories should be turned off. In another embodiment, the power management controller automatically allocates power between the host and accessories once the predetermined threshold has been reached.

8 Claims, 4 Drawing Sheets

BATTERY WITH EMBEDDED POWER MANAGEMENT

BACKGROUND

1. Technical Field

This invention relates generally to rechargeable batteries, and more particularly to smart battery systems with power allocation capabilities.

2. Background Art

Portable electronic devices are becoming as standard an accessory as a wallet or purse. People are carrying cellular phones, personal digital assistants (PDAs), pagers and the like in record numbers. For example, according to the Cellular Telecommunications Industry Association (CTIA), cellular telephone usage in the United States increased 27% between 1999 and 2000. As of December, 2000, there were over 109 million cellular subscribers in the United States alone.

Cellular telephones require batteries for portability. As people talk more and more on cellular telephones, they require more and more energy from batteries. To compound this battery capacity issue, there is a trend in the electronic accessories business to converge devices. For instance, cellular telephones are converging with personal data assistants (PDAs), MPEG-1 Audio Layer 3 (MP3) players, and the like. By way of example, the StarTac™ series phone manufactured by Motorola can be purchased with a clip-on personal data assistant, which is capable of storing appointments, phone lists, and to-do reminders. Additionally, the Visor™ personal data assistant manufactured by Handspring has an expansion slot that allows it to become a cellular telephone. Many cellular telephones have clip-on MP3 players as well.

All of these peripheral devices rely on the phone's battery for power. With increasing frequency, manufacturers of portable electronic devices are turning to lithium-ion (Li-ion) and lithium-polymer (Li-polymer) rechargeable batteries as the primary power source. These chemistries are advantageous in that they have a high energy density, which means that they offer large amounts of power per unit volume.

The various devices and high-speed circuitry associated with convergent products often consume large amounts of power when operating. This has created an additional strain on an already overtaxed battery. Nothing is more frustrating than missing a casting call for a Broadway musical because your phone battery is dead. When your agent calls for that Broadway audition, you may be very angry with yourself for having listened to the long version of "Stairway to Heaven" on your clip-on MP3 player instead of having saved the last 10% of your battery for that one additional call.

In an attempt to solve this problem, manufacturers have turned to voltage-sensing fuel gauges to try and inform the user as to how much battery power remains. A problem with lithium-based batteries is that it is hard to measure just how much power is left in them by sensing the voltage. When a primary battery discharges, like an alkaline battery for instance, the voltage drops proportionally with capacity. Thus if the working voltage has dropped by X %, the capacity has dropped in a corresponding amount. To find out how much capacity you have left, all you need to do is measure the voltage and compare it to the initial value.

Lithium-based batteries, by contrast, have a relatively flat discharge characteristic. The voltage stays essentially constant until the battery is "dead", when the voltage drops very quickly. For this reason, lithium based systems comprising fuel-gauges that measure voltage can have inaccuracies of 25% or more.

A more sophisticated, accurate method involves the use of a "Coulomb counter" fuel gauge. This fuel gauge measures the amount of power that has discharged from the battery by integrating current across time (Coulombs of charge). This technique can yield accuracy's of 1% or better in certain applications. The problem with Coulomb counting fuel gauges is that small portable products, e.g. phones, PDAs, and the like, do not have computing power available to perform power management functions in addition to measuring battery capacity.

There is thus a need for an improved means of managing power in portable electronic devices.

DETAILED DESCRIPTION OF THE INVENTION

Figure 1:
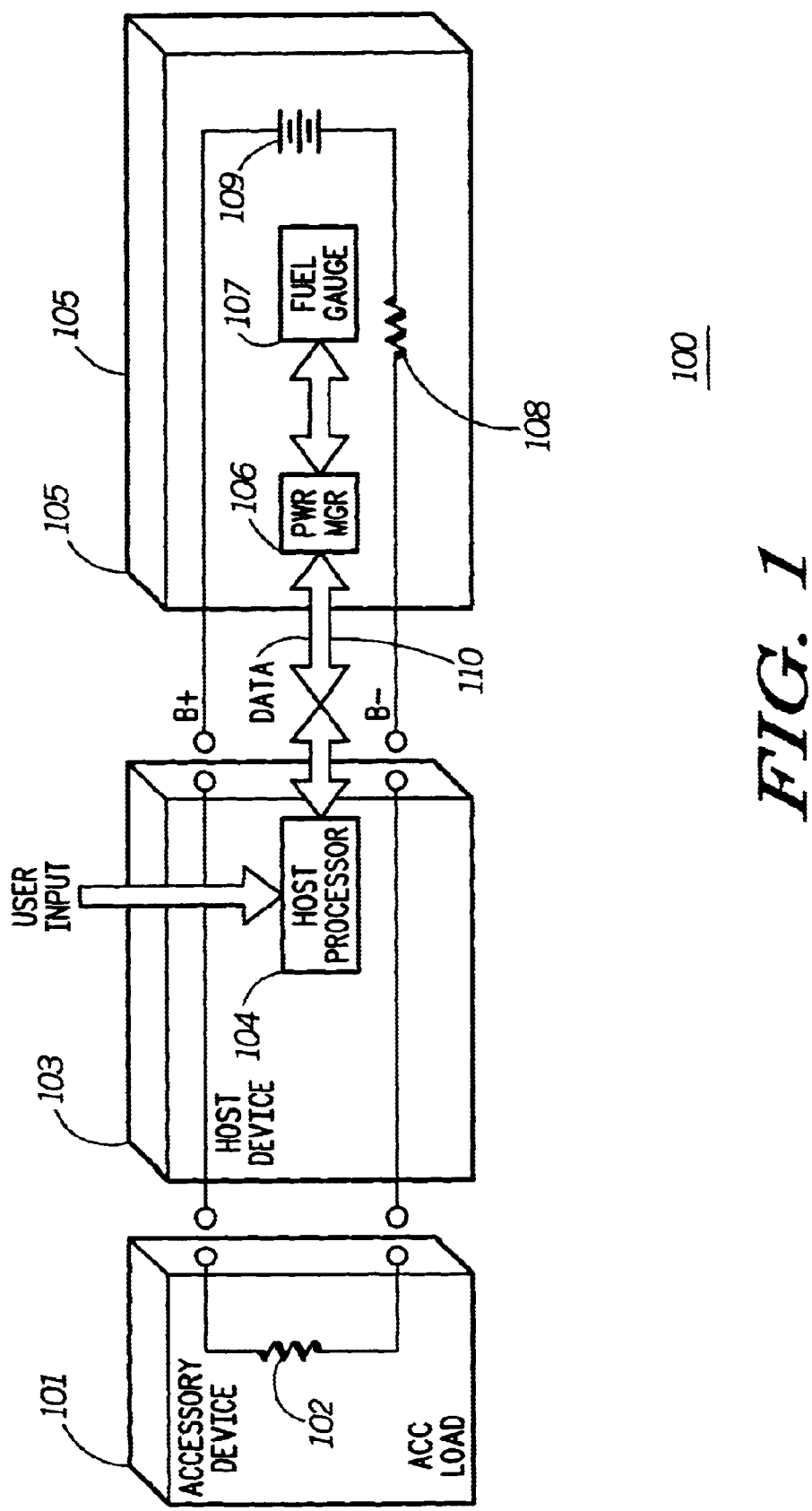
FIG. 1 illustrates one embodiment of the invention having a minimal set of features in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a","an," and "the" includes plural reference, the meaning of "in" includes "in" and "on."

In one preferred embodiment, this invention includes a simple power management scheme for allocation of energy from a Li-ion power source to portable device accessories using a coulomb counting energy measurement technique.

This invention supplies power to peripheral devices while minimizing the overall power drain from the battery. The invention also reserves a minimum amount of operating power for the primary portable device, known as the host, by shutting down peripheral devices. Moreover, this invention offers simplicity of implementation with minimal impact on host or accessory devices. The invention resides primarily with the energy source, as the energy source for these products is typically removable and separate from the remaining system. The advantage of a battery resident energy management function is to allow the simpler host design and to allow the user a choice in optional features.

In its simplest form, the invention comprises a firmware algorithm that resides in the host processor and associated memory. The host processor receives power management data from a power management controller in the battery. Upon receiving this data, the host processor actuates a firmware algorithm to determine whether to alert the user to an excessive battery drain condition.

Referring now to FIG. 1, illustrated therein is a block diagram of a hardware system 100 in accordance with a minimal feature set embodiment of the invention. The central component of the system 100 is the host device 103, which may be a cellular telephone, two-way radio, pager, PDA or similar portable electronic device. The host device 103 includes a host processor 104 that executes the device's firmware code, operating system and corresponding algorithms. One example of such a processor is the MC9328MX1, manufactured by Motorola.

Attached to the host device 103 is a battery 105 having a rechargeable cell 109, a fuel gauge 107, a current sense circuit 108 and a power management controller 106. The fuel gauge 107 measures the amount of charge entering and leaving the cell 109 as is known in the art. One example of such a fuel gauge is the bq2060 manufactured by Benchmark, a subsidiary of Texas Instruments. The fuel gauge 107 may use one of several techniques to sense current, including employing a current sense resistor 108. When current flows through the current sense resistor 108 a voltage is created across the resistor. By sensing this voltage across time, in addition to sensing the voltage of the cell 109, the fuel gauge 107 is able to measure the power flowing into and out of the cell 109.

The power management controller 106 assimilates various battery data and transports it to the host processor 104 across a data bus 110. This data bus 110 may be as simple as a one-wire interface. Such interfaces are used by power management controllers like the DS2438 manufactured by Dallas Semiconductor. Typical battery data includes cell capacity, cell state of charge, cell voltage, temperature, charging status, time, pressure and the like. Additional information maintained by the power management controller includes date of manufacture, service date, number of cycles used, preferred charging instructions and other cell specific data.

The host also includes at least one accessory device 101. The accessory device 101 may be a PDA, MP3 player, or other accessory. In any event, presuming that the accessory device 101 is electronic, it will act as a load on the battery 105. For simplicity, the loading is shown here as a resistor 102, as loads accessories 101 often draw continuous average current.

In the simplest embodiment, the battery power management controller 106 has stored within data relating to the maximum and typical host 103 power consumption requirements. This information may reside in host processor 104 as well. This data can be programmed either at the time of manufacture or in the field through real-time measurement and calibration during the charging and discharging cycles.

As the power management processor 104 has the data relating to the typical power consumption requirements of the host 103, the power management controller 106 may define a typical energy usage profile for the host 103. The energy usage profile may include a predetermined threshold. For example, if the energy usage profile is such that the host 103 typically requires 4 watts to operate, and the cell 109 can hold a maximum of 27 k Joules, the threshold may be set at 7 k Joules, which corresponds to ½ hour of remaining host 105 life.

If at some point the typical usage profile is exceeded by a predetermined amount, the total load is 6 watts as opposed to 4 watts for example, then the power management processor 106 is alerted that the additional energy demand is due to one or more accessory products. Once the predetermined energy threshold is reached, the power management controller 106 communicates to the host processor 104 that the cell 109 is becoming depleted. The host 103 will then inform the user by way of a notification means of this condition, thereby allowing the user to turn off the accessory 101.

Figure 2:
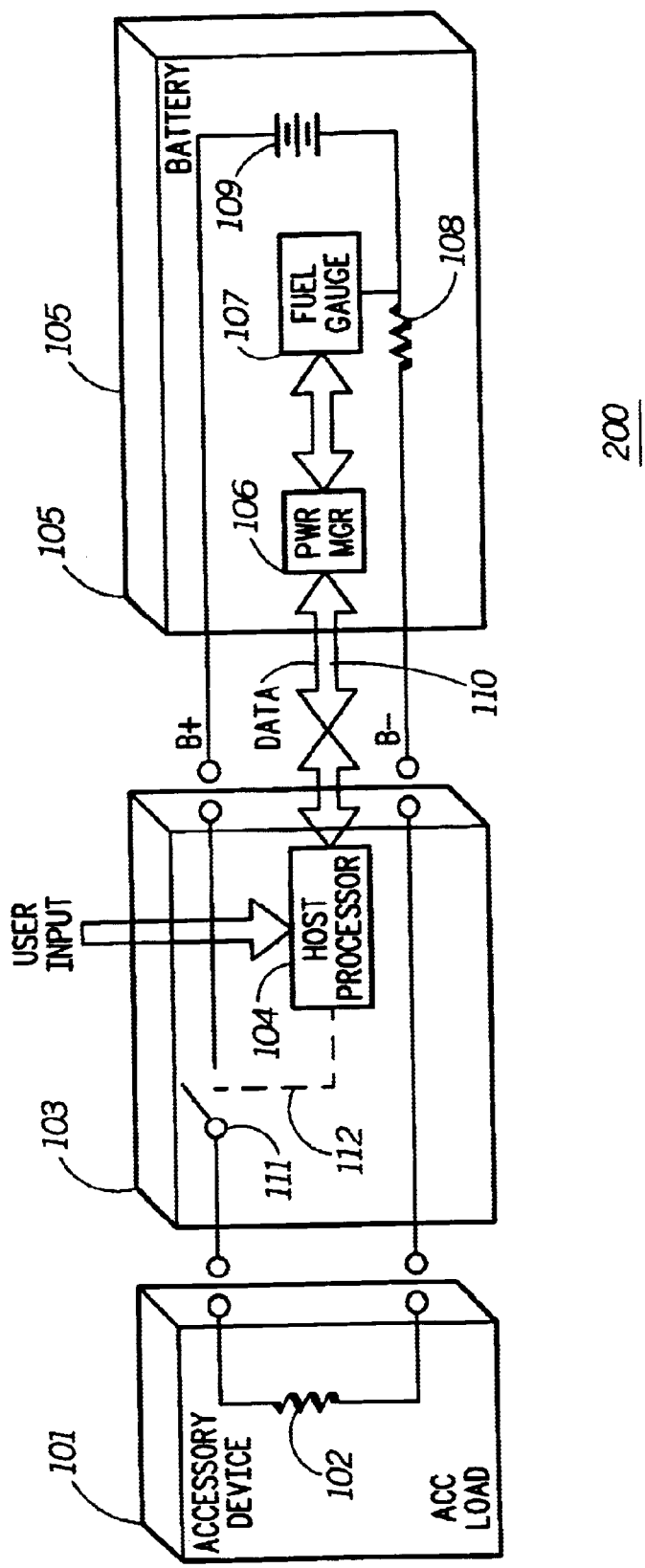
FIG. 2 illustrates an alternative embodiment having a minimal set of features in accordance with the invention.

Referring now to FIG. 2, illustrated therein is alternative embodiment having a minimal set of features in accordance with the invention. The circuit in FIG. 2 includes the same components as that shown in FIG. 1, but also includes a pass transistor 111. The host processor 104 controls the pass transistor 111 via the control line 112.

In this embodiment 200, in addition to alerting the user, the host processor 104 is able to actuate the pass transistor 111, thereby opening the circuit between battery cell 109 and load 102. When the pass transistor 111 is opened, the accessory 101 is no longer coupled to the battery 105. The accessory 101 thus stops drawing power, thereby conserving power for the host. The host processor 104 performs this actuation function when the predetermined energy threshold is reached.

The primary advantage of the embodiments shown in FIG. 1 and FIG. 2 is that prior art systems may be retrofitted with the invention with only a firmware code change. No new hardware is needed. It will be clear to those skilled in the art that the embodiments of FIG. 1 and FIG. 2 could be extended to a plurality of accessories coupled to a single host.

Figure 3:
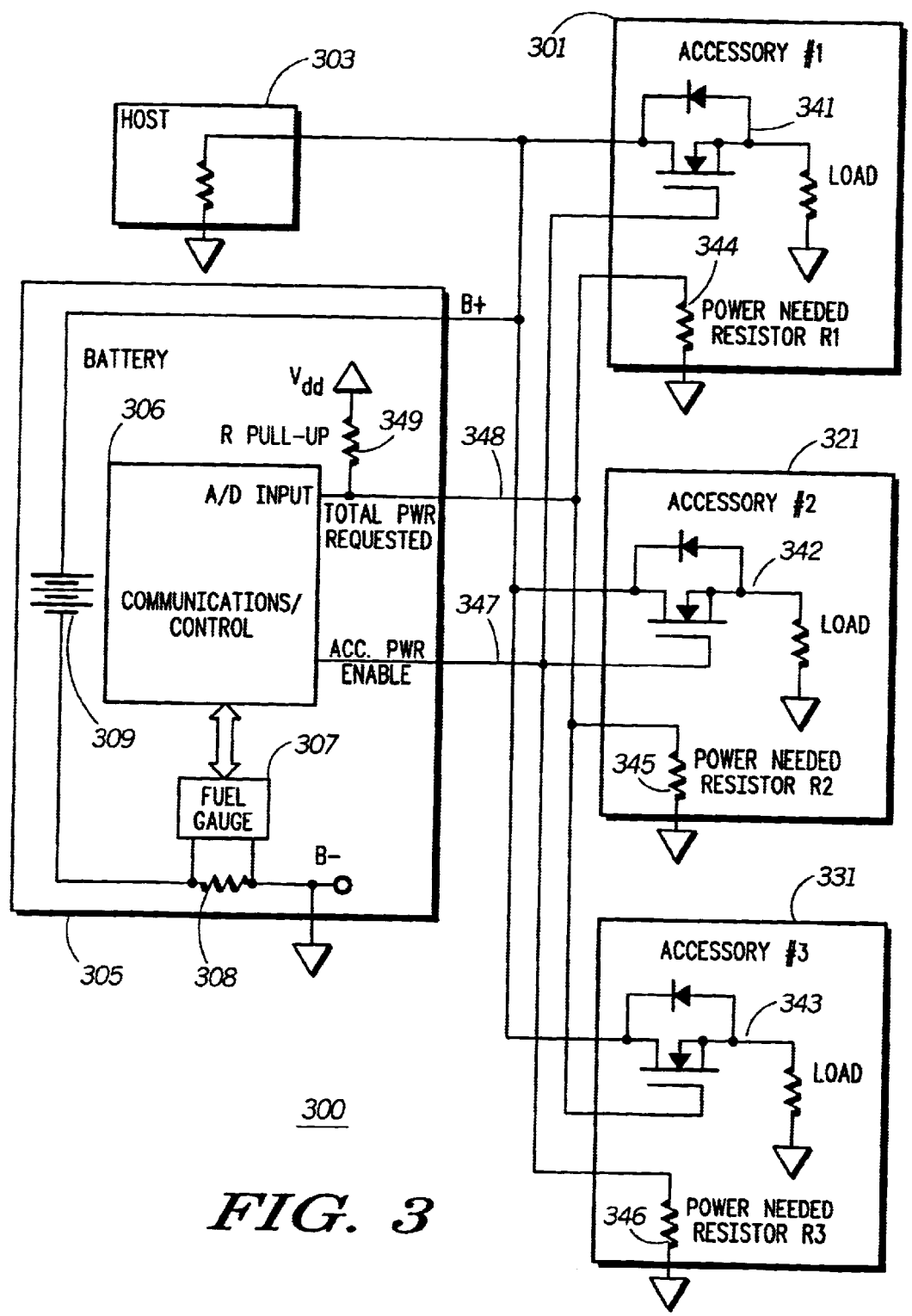
FIG. 3 is a schematic diagram of a preferred embodiment of the invention.

Referring now to FIG. 3, illustrated therein is a preferred embodiment of the invention. This embodiment employs a simple accessory modification that allows the battery 305 to directly control power to each accessory device 301, 321, 331. A coulomb counting fuel gauge 307 measures remaining capacity in the cell(s) 309. This value is compared against predetermined thresholds for the host 303.

Each accessory 301, 321, 331 coupled to the host 303 communicates its power requirement to the power management controller 305. In one exemplary embodiment, this is achieved with pull down, or "power demand", resistors 344, 345, 346. The power management controller 306 senses the voltage of the power requested terminal 348 with an on-board A/D converter. The value of this voltage is determined by the value of the pull-up resistor 349 and the paralleled impedances of the power demand resistors 344, 345, 346. In this embodiment 300, the lower the voltage of the power requested terminal 348—corresponding to more parallel power demand resistors—the more power the accessories 301, 321, 331 will consume. It will be clear to those skilled in the art that other more elaborate power demand identification schemes may be utilized with similar effects.

The power management controller 306 continually monitors the power demanded and the remaining cell 309 capacity. When the capacity drops below a predetermined threshold, the power management processor 306 can alert the user by way of a notification means or, in the alternative, deactivate the accessories by toggling the power enable line 347.

Figure 4:
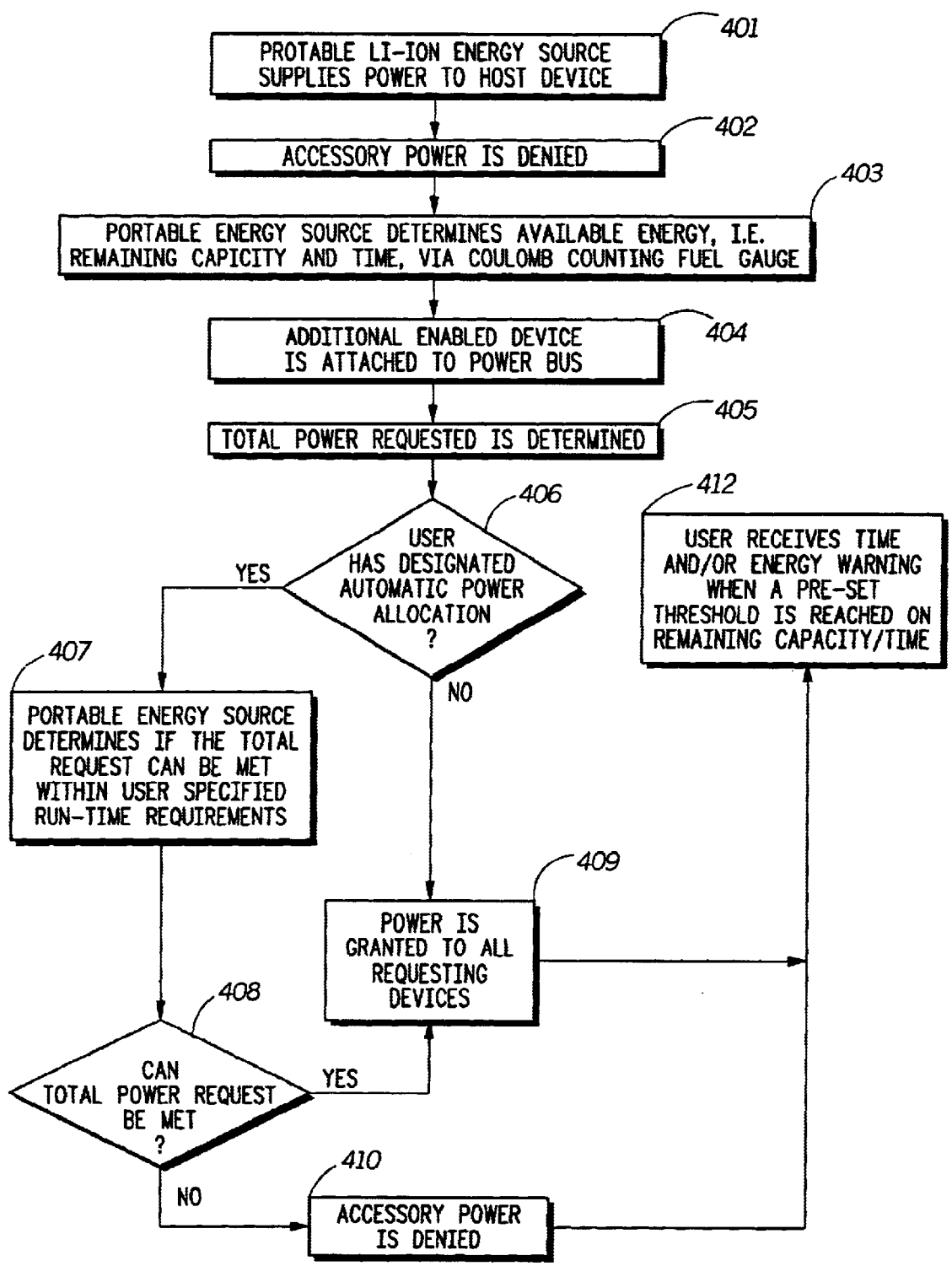
FIG. 4 is an exemplary flow chart of a preferred embodiment of the invention.

Referring now to FIG. 4, illustrated therein is a flow chart of a preferred embodiment of the invention. This flow chart is one example of a firmware algorithm that is programmed into either a power management controller or host processor. Those of ordinary skill in the art of programming will recognize steps 401 and 402 as initialization steps. Beginning at step 401, the battery cell is initiated to supply power to the host. This is the normal mode of operation. Additionally, in step 402, the power connections to accessory connectors are initialized to deny power to accessories. From these initialization points, we are ready to enter the routine.

At step 403, the power management controller takes a snap-shot of the battery conditions by reading the fuel gauge. The power management controller is thus able to determine capacity remaining in the cell. The power management controller may also check other parameters including rate of discharge or charge.

Step 404 is where the user attaches an accessory to the host device. Immediately thereafter, power management controller determines the total power requested 405. This may be done in any of a number of methods, including the resistors of FIG. 3, multiple inputs to a summing amplifier from each accessory, or digital information implemented across a communications bus.

Once the total power demand has been determined, decision 406 checks to see whether the user has enabled the automatic power allocation. If the automatic power allocation has been activated, the power management controller will disable accessories automatically via means like the pass transistors of FIG. 3 or other equivalents when the predetermined threshold has been met. The power management controller will additionally notify the user of the power management activity and of low energy warnings. This is represented by the branch of the flow chart beginning with step 407.

If automatic power allocation has either not been selected or has been disabled, the power management controller will notify the user that the predetermined threshold has been met without automatically disabling accessories. This is analogous to the embodiment of FIG. 1. This is represented on the flow chart by the loop beginning at step 409.

The present invention offers numerous advantages over the prior art. No databases are required to log information about each accessory. This invention tracks the total amount of power available from the cell and the total amount requested from all devices. Additionally, no device priorities are required. With the exception of the host, all other attached devices are identical in priority. This invention is wholly or primarily contained with the energy source, whereas other prior art solutions were completely contained in the host.

Another advantage is that this invention is separate and independent of battery charging systems, and does not involve voltage outputs or feedback for linear regulation. This invention does not involve having the battery or host revert to an alternate power operating mode, e.g. sleep or suspend in response to an external device connection. The connection of an external accessory for this invention will simply result in power being made available—or not—to operate the accessory. The invention will not arbitrate among devices to shut some down or cause the host or battery to enter a suspend state. This invention does not require or necessarily involve the use of memory.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. A power management system comprising: a host device, the host device having means to attach at least one accessory; a notification means for a user; a battery having a fuel gauge and a power management controller; and at least one accessory; wherein when a predetermined energy threshold is reached, the power management controller actuates the notification means to alert the user. The system of claim 1, wherein the power management controller has an energy profile corresponding to the energy usage of the host device stored within. The system of claim 2, further comprising at least one pass transistor, wherein the pass transistor may be actuated by the power management controller via a power enable line. The system of claim 3, wherein the power management controller actuates the at least one pass transistor when a predetermined energy threshold is reached. The system of claim 4, wherein when the at least one pass transistor is actuated, the at least one accessory is electrically decoupled from the battery. The system of claim 5 wherein the predetermined threshold is input by the user. The system of claim 6, wherein the at least one accessory has at least one energy demand associated therewith, and the at least one energy demand is communicated to the power management controller. A method for allocating power, the method comprising the steps of: providing a host device, the host device having means to attach at least one accessory; providing a notification means for a user; providing a battery having a fuel gauge and a power management controller; providing at least one accessory; determining the energy available in the battery; and actuating the notification means when a predetermined energy threshold is reached. The method of claim 8, further comprising the steps of: attaching the at least one accessory to the host; determining the total amount of power to be requested; and determining whether an automatic power allocation mode has been actuated. The method of claim 9, further comprising the steps of: determining whether the total amount of power requested can be met by the battery; and electrically coupling the battery to the at least one accessory when the total amount of power requested can be met. The method of claim 10, further comprising the step of electrically decoupling the battery from the at least one accessory when the total amount of power can not be met.

What is claimed is:

1. A power management system comprising:
   a. a host device, the host device having means for coupling to at least one accessory;
   b. a notification means for a user;
   c. a battery having a fuel gauge and a power management controller; and
   d. at least one accessory; wherein when a predetermined energy threshold is reached, the power management controller notifies the user by way of the notification means;
   wherein the power management controller has an energy profile corresponding to the energy usage of the host device, stored within; further comprising at least one pass transistor coupled serially between the battery and the at least one accessory, wherein the at least one pass transistor may be actuated by the power management controller via a power enable line.

2. A power management system comprising:
   a. a host device, the host device having means for coupling to at least one accessory;
   b. a notification means for a user;
   c. a battery having a fuel gauge and a power management controller; and
   d. at least one accessory; wherein when a predetermined energy threshold is reached, the power management controller notifies the user by way of the notification means;
   wherein the power management controller has an energy profile corresponding to the energy usage of the host device, stored within; further comprising at least one pass transistor, wherein the at least one pass transistor may be actuated by the power management controller via a power enable line;

wherein the power management controller actuates the at least one pass transistor when a predetermined energy threshold is reached.

3. The system of claim 2, wherein when the at least one pass transistor is actuated, the at least one accessory is electrically decoupled from the battery.

4. The system of claim 3 wherein the predetermined threshold is input by the user.

5. The system of claim 4, wherein the at least one accessory has at least one energy demand associated therewith, and the at least one energy demand is communicated to the power management controller.

6. A method for allocating power, the method comprising the steps of:
   a. providing a host device, the host device having means for coupling to at least one accessory;
   b. providing a notification means for a user;
   c. providing a battery having a fuel gauge and a power management controller;
   d. providing at least one accessory;
   e. determining the energy available in the battery;
   f. notifying the user by notification means when a predetermined energy threshold is reached;
   g. attaching the at least one accessory to the host;
   h. determining the total amount of power to be requested; and
   i. determining whether an automatic power allocation mode has been actuated.

7. The method of claim 6, further comprising the steps of:
   a. determining whether the total amount of power requested can be met by the battery; and
   b. electrically coupling the battery to the at least one accessory when the total amount of power requested can be met.

8. The method of claim 7, further comprising the step of electrically decoupling the battery from the at least one accessory when the total amount of power can not be met.

* * * * *